US012164318B2

(12) United States Patent
Yang et al.

(10) Patent No.: US 12,164,318 B2
(45) Date of Patent: Dec. 10, 2024

(54) REFERENCE SOURCE CIRCUIT, CHIP, POWER SUPPLY, AND ELECTRONIC APPARATUS

(71) Applicant: Chipone Technology (Beijing) Co., LTD., Beijing (CN)

(72) Inventors: Yujun Yang, Beijing (CN); Lei Fan, Beijing (CN)

(73) Assignee: Chipone Technology (Beijing) Co., LTD., Beijing (CN)

(*) Notice: Subject to any disclaimer, the term of this patent is extended or adjusted under 35 U.S.C. 154(b) by 335 days.

(21) Appl. No.: 17/727,687

(22) Filed: Apr. 22, 2022

(65) Prior Publication Data

US 2022/0244749 A1 Aug. 4, 2022

Related U.S. Application Data

(63) Continuation of application No. PCT/CN2020/132741, filed on Nov. 30, 2020.

(30) Foreign Application Priority Data

Dec. 9, 2019 (CN) ......................... 201911252891.9

(51) Int. Cl.
*G05F 1/567* (2006.01)
*G05F 3/16* (2006.01)

(52) U.S. Cl.
CPC ................ *G05F 1/567* (2013.01); *G05F 3/16* (2013.01)

(58) Field of Classification Search
CPC ............... G05F 1/567; G05F 3/16; G05F 3/30
See application file for complete search history.

(56) References Cited

U.S. PATENT DOCUMENTS 5,109,187 A 4/1992 Guliani
6,087,820 A 7/2000 Houghton et al.
(Continued)

FOREIGN PATENT DOCUMENTS

CN 101004618 A 7/2007
CN 102279618 A 12/2011
(Continued)

OTHER PUBLICATIONS

Japanese Office Action (including English translation) issued in App. No. JP2022-522061, dated Apr. 25, 2023, 7 pages.

*Primary Examiner* — Jue Zhang
*Assistant Examiner* — Afework S Demisse
(74) *Attorney, Agent, or Firm* — Butzel Long

(57) ABSTRACT

Provided are a reference source circuit, a chip, a power supply, and an electronic device. The circuit comprises: a first current generation unit used for generating first current; a reference voltage generation unit electrically connected to the first current generation unit and used for generating a band-gap reference voltage by using the first current; and a reference current generation unit electrically connected to the first current generation unit and the reference voltage generation unit and used for generating band-gap reference current by using the first current. By means of the circuit above, a band-gap reference voltage and band-gap reference current can be generated in a reference source circuit, and the first current generation unit may be reused, so that high-gain and simultaneous work of two loops can be achieved, the cost can be reduced, and the chip area can be saved as compared with the design of two separate reference sources.

16 Claims, 3 Drawing Sheets

(56) References Cited

U.S. PATENT DOCUMENTS

| | | | | |
|---|---|---|---|---|
| 6,225,856 | B1 * | 5/2001 | Toth | G05F 3/30 327/539 |
| 2011/0298529 | A1 | 12/2011 | Kung | |
| 2013/0257396 | A1 * | 10/2013 | Tung | G05F 3/30 323/265 |
| 2014/0077789 | A1 * | 3/2014 | Hu | G05F 3/30 323/313 |
| 2014/0247034 | A1 | 9/2014 | Lok | |
| 2022/0050489 | A1 * | 2/2022 | Wu | G05F 3/30 |

FOREIGN PATENT DOCUMENTS

| | | | | |
|---|---|---|---|---|
| CN | 102419609 | A | | 4/2012 |
| CN | 103163935 | A | | 6/2013 |
| CN | 104156023 | A | * | 11/2014 |
| CN | 104793690 | A | | 7/2015 |
| CN | 105912066 | A | | 8/2016 |
| CN | 205620849 | U | | 10/2016 |
| CN | 109976425 | A | | 7/2019 |
| CN | 110865677 | A | | 3/2020 |
| JP | 2000330658 | A | | 11/2000 |

* cited by examiner

REFERENCE SOURCE CIRCUIT, CHIP, POWER SUPPLY, AND ELECTRONIC APPARATUS

CROSS-REFERENCE

This application is a continuation application of International Application No. PCT/CN2020/132741, filed on Nov. 30, 2020, which claims priority to Chinese application No. 201911252891.9 filed on Dec. 9, 2019, both of which are incorporated by reference herein.

TECHNICAL FIELD

The present disclosure relates to the technical field of integrated circuits, and in particular to a reference source circuit, a chip, a power supply and an electronic apparatus.

BACKGROUND

A bandgap reference source, which is used as a basic module in an integrated circuit system, is configured to generate a voltage reference or a current reference independent of a power supply and a temperature. At present, the bandgap reference source commonly used inside a chip is a single bandgap voltage source or bandgap current source. Because a resistance in a semiconductor process usually has a certain temperature coefficient, it is difficult to simultaneously achieve the bandgap voltage source and the bandgap current source in the related art. Consequently, it is necessary to prepare two separate circuits, which causes high cost and wastes an area of a chip.

SUMMARY

In view of the foregoing, the present disclosure provides a reference source circuit, comprising:

- a first current generating unit configured to generate a first current;
- a reference voltage generating unit electrically connected to the first current generating unit, configured to generate a bandgap reference voltage by using the first current; and
- a reference current generating unit electrically connected to the first current generating unit and the reference voltage generating unit, configured to generate a bandgap reference current by using the first current.

In a possible embodiment, the reference voltage generating unit comprises a first transistor, a second transistor, a third transistor, a fourth transistor, a fifth transistor, a first resistor, a second resistor, a third resistor, a first capacitor, and a second capacitor, wherein,

- a drain of the first transistor is electrically connected to a source of the second transistor, a source of the third transistor, and a voltage source; a gate of the first transistor is electrically connected to a first terminal of the second resistor, a drain of the third transistor, a collector of the fifth transistor, and a startup circuit and configured to receive a startup signal output by the startup circuit; and a source of the first transistor is electrically connected to a first terminal of the first resistor, a first terminal of the first capacitor, and a first terminal of the second capacitor, and configured to output the bandgap reference voltage;
- both a second terminal of the first capacitor and a second terminal of the first resistor are electrically connected to the first current generating unit;

- a second terminal of the second resistor is electrically connected to a first terminal of the third capacitor;
- a drain of the second transistor is electrically connected to a gate of the second transistor, a gate of the third transistor and a collector of the fourth transistor;
- a first terminal of the third resistor is electrically connected to the first current generating unit;
- both a base of the fifth transistor and a base of the fourth transistor are electrically connected to the first current generating unit; and
- an emitter of the fifth transistor, an emitter of the fourth transistor, a second terminal of the third resistor, and a second terminal of the second capacitor are grounded.

In a possible embodiment, the first current generating unit comprises a fourth resistor, a fifth resistor, a sixth transistor, and a seventh transistor, wherein,

- a first terminal of the fourth resistor is electrically connected to the second terminal of the first capacitor, the second terminal of the first resistor, a first terminal of the fifth resistor, and a base of the sixth transistor; and a second terminal of the fourth resistor is electrically connected to a collector of the sixth transistor, a base of the seventh transistor, and the base of the fourth transistor;
- a second terminal of the fifth resistor is electrically connected to both a collector of the seventh transistor and the base of the fifth transistor;
- both an emitter of the sixth transistor and an emitter of the seventh transistor are electrically connected to the first terminal of the third resistor; and
- wherein the collector of the sixth transistor is configured to generate the first current.

In a possible embodiment, the reference current generating unit comprises the second transistor, the fourth transistor, an eighth transistor, a ninth transistor, a tenth transistor, an eleventh transistor, a twelfth transistor, a thirteenth transistor, a fifth capacitor, a sixth resistor, a seventh resistor, and an eighth resistor, wherein,

- a gate of the eighth transistor is electrically connected to the gate of the second transistor; a source of the eighth transistor is electrically connected to the source of the second transistor, a source of the twelfth transistor, and a source of the thirteenth transistor; and a drain of the eighth transistor is electrically connected to a collector of the ninth transistor;
- a base of the ninth transistor is electrically connected to a source of the tenth transistor, a collector of the eleventh transistor, and a first terminal of the eighth resistor;
- a gate of the tenth transistor is electrically connected to a first terminal of the sixth resistor, the collector of the ninth transistor, and the drain of the eighth transistor; a second terminal of the sixth resistor is electrically connected to the first terminal of the fifth capacitor; a base of the eleventh transistor is electrically connected to the first terminal of the fourth resistor, the first terminal of the fifth resistor, the base of the sixth transistor, and the second terminal of the first capacitor; and an emitter of the eleventh transistor is electrically connected to a first terminal of the seventh resistor;
- a second terminal of the fifth capacitor, an emitter of the ninth transistor, a second terminal of the seventh resistor, and a second terminal of the eighth resistor are grounded;
- a gate of the twelfth transistor is electrically connected to a source of the twelfth transistor, a gate of the thirteenth transistor, and a drain of the tenth transistor; and a drain of the thirteenth transistor is configured to output the bandgap reference current.

In a possible embodiment, a resistance value of the third resistor is equal to a resistance value of the parallelly-connected fourth resistor and fifth resistor, and a resistance value of the fourth resistor is equal to a resistance value of the seventh resistor.

According to another aspect of the present disclosure, there is provided a chip, comprising:

the reference source circuit.

According to another aspect of the present disclosure, there is provided a power supply, comprising:

the chip.

According to another aspect of the present disclosure, there is provided an electronic apparatus, comprising:

the power supply.

With the above circuit, it is possible to generate the bandgap reference voltage and the bandgap reference current in one reference source circuit, and multiplex the first current generating unit according to the embodiments of the present disclosure, which can achieve a high gain and a simultaneous operation of double loops, thereby saving the cost. Compared with the related art in which two separate reference sources are provided, the present disclosure can save the area of the chip.

Other features and aspects of the present disclosure will become apparent from the following detailed description of exemplary embodiments with reference to the accompanying drawings.

BRIEF DESCRIPTION OF THE DRAWINGS

The drawings, which are incorporated in and constitute a part of the specification, illustrate exemplary embodiments, features and aspects of the present disclosure together with the specification, and serve to explain the principles of the present disclosure.

DETAILED DESCRIPTION OF THE EMBODIMENTS

Figure 1:
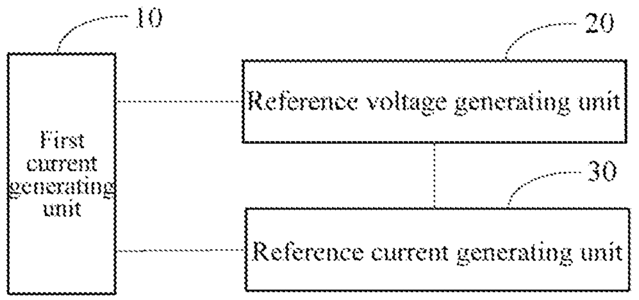
FIG. 1 shows a schematic diagram of a reference source circuit according to an embodiment of the present disclosure.

Hereinafter, various exemplary embodiments, features and aspects of the present disclosure will be described in detail with reference to the drawings. In the drawings, the same reference numerals refer to elements with the same or similar functions. Although various aspects of the embodiments are shown in the drawings, the drawings are not necessarily drawn to scale unless otherwise specified.

The special word "exemplary" here means "serving as an example, embodiment or illustration". Any embodiment described herein as "exemplary" need not be interpreted as superior to or better than other embodiments.

In addition, in order to better describe the present disclosure, numerous details are provided in the following embodiments. It is understood by those skilled in the art that the present disclosure can also be implemented without certain details. In some embodiments, methods, means, elements and circuits well known to those skilled in the art are not elaborated in order to highlight the main idea of the present disclosure.

Please refer to FIG. 1 which shows a schematic diagram of a reference source circuit according to an embodiment of the present disclosure.

As shown in FIG. 1, the circuit includes:

a first current generating unit 10 configured to generate a first current;

a reference voltage generating unit 20 electrically connected to the first current generating unit 10, configured to generate a bandgap reference voltage by using the first current; and a reference current generating unit 30 electrically connected to both the first current generating unit 10 and the reference voltage generating unit 20, configured to generate a bandgap reference current by using the first current.

With the above circuit, it is possible to generate the bandgap reference voltage and the bandgap reference current in one reference source circuit, and multiplex the first current generating unit according to the embodiment of the present disclosure, which can achieve a high gain and a simultaneous operation of double loops, thereby saving the cost. Compared with the related art in which two separate reference sources are provided, the present disclosure can save the area of the chip.

The reference source circuit can be provided in an electronic device. The electronic device can also be referred to as a mobile device, which can refer to various forms of an access mobile device, a user unit, a user device, a user station, a Mobile Station (MS), a remote station, a remote mobile device, a mobile device, a user mobile device, a terminal equipment, a wireless communication device, a user agent or a user apparatus. The user device can also be a cellular phone, a cordless phone, a Session Initiation Protocol (SIP) phone, a Wireless Local Loop (WLL) station, a Personal Digital Assistant (PDA), a handheld device with a wireless communication function, a computing device, other processing devices connected to a wireless modem, a vehicle-mounted device, a wearable device, a user device in future 5G network, or a mobile device in future evolved Public Land Mobile Network (PLMN), etc., which is not limited by the embodiments of the present disclosure.

The following describes the possible implementation of various units in the reference source circuit.

Figure 2:
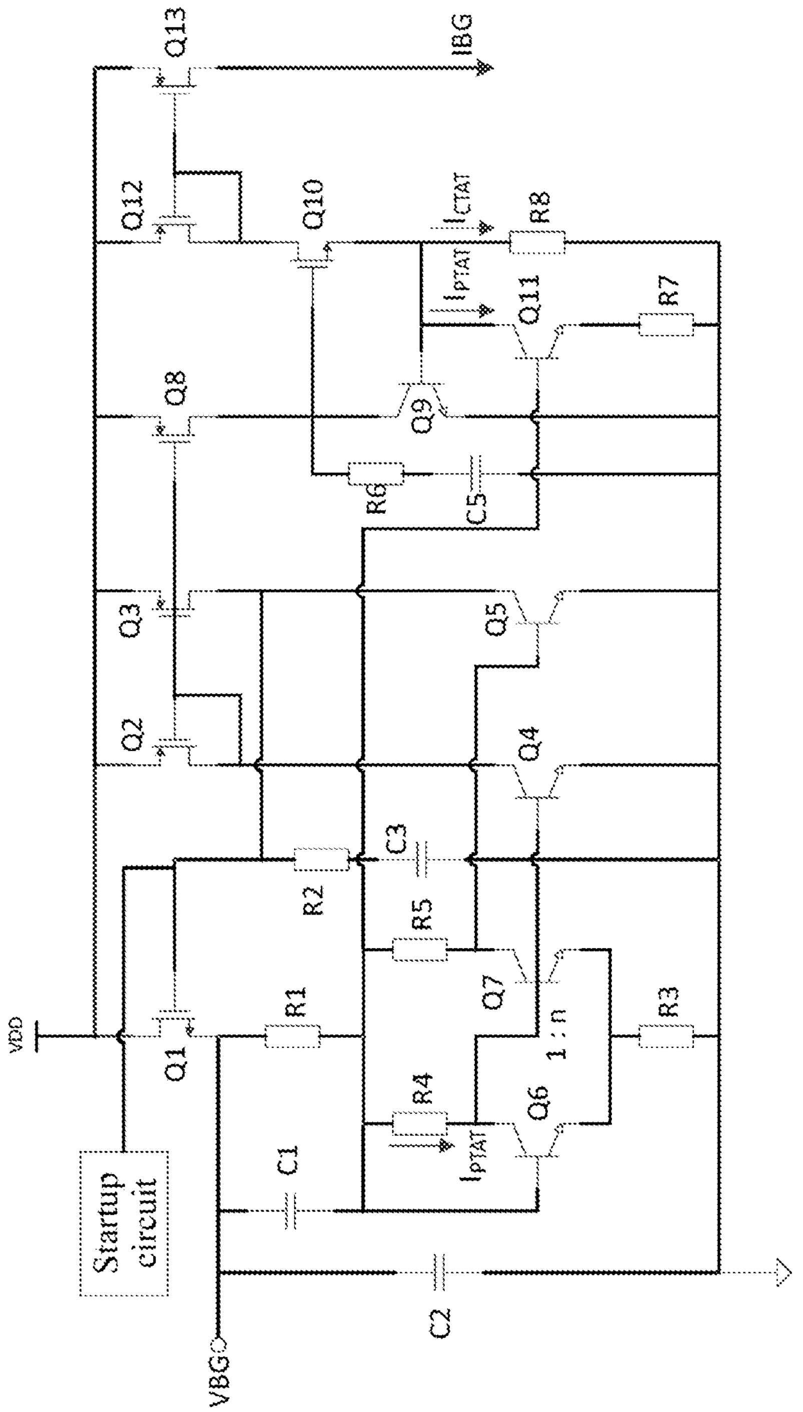
FIG. 2 shows a schematic diagram of a reference source circuit according to an embodiment of the present disclosure.
Figure 3:
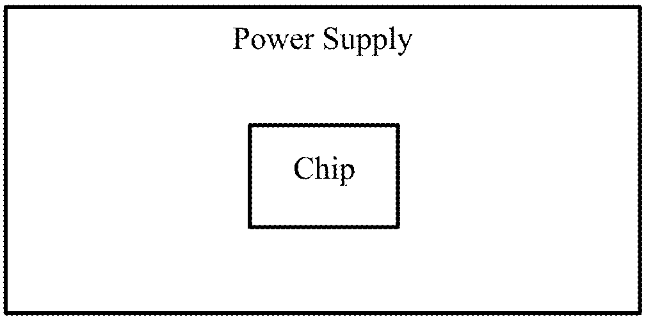
FIG. 3 shows a schematic diagram of a power supply comprising a chip according to an embodiment of the present disclosure.

Please refer to FIG. 2 which shows a schematic diagram of a reference source circuit according to an embodiment of the present disclosure.

In a possible embodiment, as shown in FIG. 2, the reference voltage generating unit 20 may comprises a first transistor Q1, a second transistor Q2, a third transistor Q3, a fourth transistor Q4, a fifth transistor Q5, a first resistor R1, a second resistor R2, a third resistor R3, a first capacitor C1, and a second capacitor C2, where, a drain of the first transistor Q1 is electrically connected to a source of the second transistor Q2, a source of the third transistor Q3 and a voltage source VDD; a gate of the first transistor Q1 is electrically connected to a first terminal of the second resistor R2, a drain of the third transistor Q3, a collector of the fifth transistor Q5 and a startup circuit, configured to receive a startup signal output by the startup circuit; and a source of the first transistor Q1 is electrically connected to a first terminal of the first resistor R1, a first terminal of the first capacitor C1 and a first terminal of the second capacitor C2, and configured to output the bandgap reference voltage VBG;

both a second terminal of the first capacitor C1 and a second terminal of the first resistor R1 are electrically connected to the first current generating unit 10;

a second terminal of the second resistor R2 is electrically connected to a first terminal of the third capacitor C3;

a drain of the second transistor Q2 is electrically connected to a gate of the second transistor Q2, a gate of the third transistor Q3, and a collector of the fourth transistor Q4;

a first terminal of the third resistor R3 is electrically connected to the first current generating unit 10;

both a base of the fifth transistor Q5 and a base of the fourth transistor Q4 are electrically connected to the first current generating unit 10; and an emitter of the fifth transistor Q5, an emitter of the fourth transistor Q4, a second terminal of the third resistor R3, and a second terminal of the second capacitor C2 are grounded.

the first transistor Q1, the second transistor Q2 and the third transistor Q3 may be Metal-Oxide-Semiconductor Field-Effect Transistors (MOSFETs), and both the fourth transistor Q4 and the fifth transistor Q5 may be triodes.

It should be noted that the embodiments of the present disclosure do not limit the specific implementation of the startup circuit, and those skilled in the art can refer to relevant art to implement the startup circuit.

In an embodiment, when the bandgap reference voltage and the bandgap reference current need to be generated, the startup circuit may output a startup signal to start the reference source circuit to generate the bandgap reference voltage and the bandgap reference current.

In an embodiment, the startup signal may be a pulse signal.

In a possible embodiment, the first current generating unit may generate a current proportional to absolute temperature (PTAT), that is, the first current may be a PTAT current.

In a possible embodiment, as shown in FIG. 2, the first current generating unit 10 may include a fourth resistor R4, a fifth resistor R5, a sixth transistor Q6, and a seventh transistor Q7, where, a first terminal of the fourth resistor R4 is electrically connected to a second terminal of the first capacitor C1, a second terminal of the first resistor R1, a first terminal of the fifth resistor R5, and a base of the sixth transistor Q6; and a second terminal of the fourth resistor R4 is electrically connected to a collector of the sixth transistor Q6, a base of the seventh transistor Q7, and a base of the fourth transistor Q4;

a second terminal of the fifth resistor R5 is electrically connected to both a collector of the seventh transistor Q7 and a base of the fifth transistor Q5; and both an emitter of the sixth transistor Q6 and an emitter of the seventh transistor Q7 are electrically connected to a first terminal of the third resistor R3, wherein a collector of the sixth transistor Q6 is configured to generate the first current $I_{PTAT}$.

In an embodiment, the magnitude of the first current may be:

$$I_{PTAT} = \frac{1}{R4} \cdot V_T \cdot \ln\left(\frac{n \cdot R5}{R4}\right),$$

where R4 represents a resistance value of the fourth resistor R4, R5 represents a resistance value of the fifth resistor R5, and $V_T$ represents a voltage equivalent of temperature, where $V_T$=kT/q, where k is Boltzmann constant ($1.38\times10^{-23}$ J/K), T is a thermodynamic temperature, namely, an absolute temperature, and q is an electron charge ($1.6\times10^{-19}$ C). At normal temperature, VT≈26 mV.

In a possible embodiment, both the sixth transistor Q6 and the seventh transistor Q7 may be triodes, and a ratio of the number of the sixth transistors Q6 to the number of the seventh transistors Q7 may be 1: n, where n is an integer greater than 1. Of course, the above ratio is not limited in the present disclosure, and can be determined by those skilled in the art as required.

In a possible embodiment, as shown in FIG. 2, the bandgap reference voltage VBG can be $V_{BE}+I_{PTAT}\cdot$(R1+R3), and $$VBG = V_{BE} + \left(\frac{R1}{R4 \parallel R5} + 1\right) \cdot V_T \cdot \ln\left(\frac{n \cdot R5}{R4}\right)$$

can be obtained from $$I_{PTAT} = \frac{1}{R4} \cdot V_T \cdot \ln\left(\frac{n \cdot R5}{R4}\right),$$

where "·" means a multiplication operation, "||" means a parallel connection, "+" means an addition operation, $V_{BE}$ represents a base-emitter voltage of the sixth transistor, $V_{BE}$ is a negative temperature coefficient, R1 represents a resistance value of the first resistor, R4 represents a resistance value of the fourth resistor, R5 represents a resistance value of the fifth resistor, $V_T$ represents a voltage equivalent of temperature, $V_T$ is a positive temperature coefficient, and n represents a ratio of the number of the seventh transistors to the number of the sixth transistors.

According to the embodiment of the present disclosure, a zero-temperature coefficient of the bandgap reference voltage VBG can be achieved by setting the resistance values of the first resistor R1, the fourth resistor R4 and the fifth resistor R5. Of course, the specific resistance values of the first resistor R1, the fourth resistor R4 and the fifth resistor R5 are not limited in the present disclosure, and can be determined by those skilled in the art according to the actual situation.

In a possible embodiment, as shown in FIG. 2, the reference current generating unit 30 may include the second transistor Q2, the fourth transistor Q4, an eighth transistor Q8, a ninth transistor Q9, a tenth transistor Q10, an eleventh transistor Q11, a twelfth transistor Q12, a thirteenth transistor Q13, a fifth capacitor C5, a sixth resistor R6, a seventh resistor R7, and an eighth resistor R8, where, a gate of the eighth transistor Q8 is electrically connected to the gate of the second transistor Q2; a source of the eighth transistor Q8 is electrically connected to the source of the second transistor Q2, a source of the twelfth transistor Q12 and a source of the thirteenth transistor Q13; and the drain of the eighth transistor Q8 is electrically connected to the collector of the ninth transistor Q9;

a base of the ninth transistor Q9 is electrically connected to a source of the tenth transistor Q10, a collector of the eleventh transistor Q11, and a first terminal of the eighth resistor R8;

a gate of the tenth transistor Q10 is electrically connected to a first terminal of the sixth resistor R6, the collector of the ninth transistor Q9, and the drain of the eighth transistor Q8; a second terminal of the sixth resistor R6 is electrically connected to a first terminal of the fifth capacitor C5; a base of the eleventh transistor Q11 is electrically connected to the first terminal of the fourth resistor R4, the first terminal of the fifth resistor R5, the base of the sixth transistor Q6, and the second terminal of the first capacitor C1; and an emitter of the eleventh transistor Q11 is electrically connected to a first terminal of the seventh resistor R7;

a second terminal of the fifth capacitor C5, an emitter of the ninth transistor Q9, a second terminal of the seventh resistor R7, and a second terminal of the eighth resistor R8 are grounded;

a gate of the twelfth transistor Q12 is electrically connected to the source of the twelfth transistor Q12, a gate of the thirteenth transistor Q13, and a drain of the tenth transistor Q10; and a drain of the thirteenth transistor Q13 is configured to output the bandgap reference current IBG.

In a possible embodiment, the eighth transistor Q8, the tenth transistor Q10, the twelfth transistor Q12 and the thirteenth transistor Q13 may be MOSFET, and both the ninth transistor Q9 and the eleventh transistor Q11 may be triodes.

In an embodiment, the first transistor Q1, the second transistor Q2, the third transistor Q3, the fourth transistor Q4, and the fifth transistor Q5 constitute an operational amplifier in the reference voltage generating unit, whose operational amplifier gain is about A1=gm4·(ro3||ro5), where ro3 represents a drain-source small signal output impedance of the third transistor Q3, ro5 represents a drain-source small signal output impedance of the fifth transistor Q5, and gm4 represents a transconductance of the fourth transistor Q4, which is equal to transconductance of the fifth transistor Q5 and the ninth transistor Q9. As can be clear from the above, the reference voltage generating unit is a voltage series negative feedback, and the voltage closed-loop output impedance is 1/A1 times of the open-loop output impedance, so the driving force of the output bandgap reference voltage is higher.

In an embodiment, the second transistor Q2, the fourth transistor Q4, the eighth transistor Q8, the ninth transistor Q9, and the tenth transistor Q10 constitute an operational amplifier of the reference current generating unit, whose operational amplifier gain is about A2=gm4·(ro8||ro9), where ro8 represents a drain-source small signal output impedance of the eighth transistor Q8, and ro9 represents a drain-source small signal output impedance of the ninth transistor Q9. As can be clear from the above, the reference current generating unit is a current series negative feedback, and the current closed-loop output impedance is A2 times of the open-loop output impedance.

According to the embodiment of the present disclosure, the reference voltage generating unit and the reference current generating unit can generate two types of bandgap references (a bandgap reference voltage and a bandgap reference current) in one circuit by sharing the first current generating unit 10 and sharing the second transistor Q2 and the fourth transistor Q4. Compared with the related art which does not use an operational amplifier to achieve the reference source, the embodiment of the present disclosure can achieve a high gain and a simultaneous operation of double loops via dual operational amplifier loops, which takes a low cost and occupies a less layout area. In addition, according to the reference source circuit in the embodiments of the present disclosure, the driving force of the bandgap reference voltage is higher, and the output impedance of the bandgap reference current is larger, which is beneficial to improving the work efficiency.

As shown in FIG. 2, both the sixth transistor Q6 and the third resistor R3 constitute a current mirror with the eleventh transistor Q11 and the seventh resistor R7, so the reference current generating unit 30 can obtain a bandgap reference current $IBG=I_{CTAT}+I_{PTAT}$ by using a first current $I_{PTAT}$, where $I_{CTAT}$ represents a current flowing through the eighth resistor R8, where $$I_{CTAT}=\frac{V_{BE}}{R8}.$$

Therefore, $$IBG=\frac{V_{BE}}{R8}+\frac{1}{R4}\cdot V_T\cdot\ln\left(\frac{n\cdot R5}{R4}\right)$$

can be obtained, where $V_{BE}$ represents a base-emitter voltage of the sixth transistor Q6, $V_{BE}$ is a negative temperature coefficient, R8 represents a resistance value of the eighth resistor R8, R4 represents a resistance value of the fourth resistor R4, R5 represents a resistance value of the fifth resistor R5, $V_T$ represents a voltage equivalent of temperature, $V_T$ is a positive temperature coefficient, and n represents a ratio of the number of the seventh transistors to the number of the sixth transistors.

According to the embodiments of the present disclosure, a zero-temperature coefficient of the bandgap reference current IBG can be achieved by adjusting the resistance values of both the eight resistor R8 and the fourth resistor R4.

Of course, the specific resistance values of the eighth resistor R8 and the fourth resistor R4 are not limited in the embodiments of the present disclosure, and can be determined by those skilled in the art according to the actual situation.

In a possible embodiment, the third resistor R3, the fourth resistor R4, the fifth resistor R5 and the seventh resistor R7 can be configured to satisfy the following relationship, so as to better output the bandgap reference voltage and the bandgap reference current in the embodiment of the present disclosure:

a resistance value of the third resistor is equal to a resistance value of the parallelly-connected fourth resistor and fifth resistor, and a resistance value of the fourth resistor is equal to a resistance value of the seventh resistor, that is, R3=R4||R5, R4=R7, where R3 represents the third resistor, R4 represents the fourth resistor, R5 represents the fifth resistor, and R7 represents the seventh resistor.

With the above circuit, it is possible to simultaneously generate the bandgap reference current and the bandgap reference voltage with a zero-temperature coefficient in one circuit according to the embodiment of the present disclosure, which has a lower cost and occupies a smaller layout area compared with related art and thus is beneficial to popularization and utilization.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

The invention claimed is:

1. A reference source circuit, comprising:

a first current generating unit configured to generate a first current;

a reference voltage generating unit electrically connected to the first current generating unit, configured to generate a bandgap reference voltage by using the first current; and a reference current generating unit electrically connected to both the first current generating unit and the reference voltage generating unit, and configured to generate a bandgap reference current by using the first current;

wherein the reference voltage generating unit comprises a first transistor, a second transistor, a third transistor, a fourth transistor, a fifth transistor, a first resistor, a second resistor, a third resistor, a first capacitor, and a second capacitor, and wherein:

a drain of the first transistor is electrically connected to a source of the second transistor, a source of the third transistor, and a voltage source; a gate of the first transistor is electrically connected to a first terminal of the second resistor, a drain of the third transistor, a collector of the fifth transistor, and a startup circuit and configured to receive a startup signal output by the startup circuit; and a source of the first transistor is electrically connected to a first terminal of the first resistor, a first terminal of the first capacitor, and a first terminal of the second capacitor, and configured to output the bandgap reference voltage;

both a second terminal of the first capacitor and a second terminal of the first resistor are electrically connected to the first current generating unit;

a second terminal of the second resistor is electrically connected to a first terminal of the third capacitor;

a drain of the second transistor is electrically connected to a gate of the second transistor, a gate of the third transistor and a collector of the fourth transistor;

a first terminal of the third resistor is electrically connected to the first current generating unit;

both a base of the fifth transistor and a base of the fourth transistor are electrically connected to the first current generating unit; and an emitter of the fifth transistor, an emitter of the fourth transistor, a second terminal of the third resistor, and a second terminal of the second capacitor are grounded.

2. The circuit according to claim 1, wherein the first current generating unit comprises a fourth resistor, a fifth resistor, a sixth transistor, and a seventh transistor, wherein, a first terminal of the fourth resistor is electrically connected to the second terminal of the first capacitor, the second terminal of the first resistor, a first terminal of the fifth resistor, and a base of the sixth transistor; and a second terminal of the fourth resistor is electrically connected to a collector of the sixth transistor, a base of the seventh transistor, and the base of the fourth transistor;

a second terminal of the fifth resistor is electrically connected to both a collector of the seventh transistor and the base of the fifth transistor;

both an emitter of the sixth transistor and an emitter of the seventh transistor are electrically connected to the first terminal of the third resistor; and wherein the collector of the sixth transistor is configured to generate the first current.

3. The circuit according to claim 2, wherein the reference current generating unit comprises the second transistor, the fourth transistor, an eighth transistor, a ninth transistor, a tenth transistor, an eleventh transistor, a twelfth transistor, a thirteenth transistor, a fifth capacitor, a sixth resistor, a seventh resistor, and an eighth resistor, wherein, a gate of the eighth transistor is electrically connected to the gate of the second transistor; a source of the eighth transistor is electrically connected to the source of the second transistor, a source of the twelfth transistor, and a source of the thirteenth transistor; and a drain of the eighth transistor is electrically connected to a collector of the ninth transistor;

a base of the ninth transistor is electrically connected to a source of the tenth transistor, a collector of the eleventh transistor, and a first terminal of the eighth resistor;

a gate of the tenth transistor is electrically connected to a first terminal of the sixth resistor, the collector of the ninth transistor, and the drain of the eighth transistor; a second terminal of the sixth resistor is electrically connected to the first terminal of the fifth capacitor; a base of the eleventh transistor is electrically connected to the first terminal of the fourth resistor, the first terminal of the fifth resistor, the base of the sixth transistor, and the second terminal of the first capacitor; and an emitter of the eleventh transistor is electrically connected to a first terminal of the seventh resistor;

a second terminal of the fifth capacitor, an emitter of the ninth transistor, a second terminal of the seventh resistor, and a second terminal of the eighth resistor are grounded;

a gate of the twelfth transistor is electrically connected to a source of the twelfth transistor, a gate of the thirteenth transistor, and a drain of the tenth transistor; and a drain of the thirteenth transistor is configured to output the bandgap reference current.

4. The circuit according to claim 3, wherein a resistance value of the third resistor is equal to a resistance value of the fourth resistor and the fifth resistor connected in parallel, and a resistance value of the fourth resistor is equal to a resistance value of the seventh resistor.

5. A chip comprising a reference source circuit, the reference source circuit comprising:

a first current generating unit configured to generate a first current;

a reference voltage generating unit electrically connected to the first current generating unit, configured to generate a bandgap reference voltage by using the first current; and a reference current generating unit electrically connected to both the first current generating unit and the reference voltage generating unit, and configured to generate a bandgap reference current by using the first current;

wherein the reference voltage generating unit comprises a first transistor, a second transistor, a third transistor, a fourth transistor, a fifth transistor, a first resistor, a second resistor, a third resistor, a first capacitor, and a second capacitor, and wherein:

a drain of the first transistor is electrically connected to a source of the second transistor, a source of the third transistor, and a voltage source; a gate of the first transistor is electrically connected to a first terminal of the second resistor, a drain of the third transistor, a collector of the fifth transistor, and a startup circuit and configured to receive a startup signal output by the startup circuit; and a source of the first transistor is electrically connected to a first terminal of the first resistor, a first terminal of the first capacitor, and a first terminal of the second capacitor, and configured to output the bandgap reference voltage;

both a second terminal of the first capacitor and a second terminal of the first resistor are electrically connected to the first current generating unit;

a second terminal of the second resistor is electrically connected to a first terminal of the third capacitor;

a drain of the second transistor is electrically connected to a gate of the second transistor, a gate of the third transistor and a collector of the fourth transistor;

a first terminal of the third resistor is electrically connected to the first current generating unit;

both a base of the fifth transistor and a base of the fourth transistor are electrically connected to the first current generating unit; and an emitter of the fifth transistor, an emitter of the fourth transistor, a second terminal of the third resistor, and a second terminal of the second capacitor are grounded.

6. The chip circuit according to claim 5, wherein the first current generating unit comprises a fourth resistor, a fifth resistor, a sixth transistor, and a seventh transistor, wherein, a first terminal of the fourth resistor is electrically connected to the second terminal of the first capacitor, the second terminal of the first resistor, a first terminal of the fifth resistor, and a base of the sixth transistor; and a second terminal of the fourth resistor is electrically connected to a collector of the sixth transistor, a base of the seventh transistor, and the base of the fourth transistor;

a second terminal of the fifth resistor is electrically connected to both a collector of the seventh transistor and the base of the fifth transistor;

both an emitter of the sixth transistor and an emitter of the seventh transistor are electrically connected to the first terminal of the third resistor; and wherein the collector of the sixth transistor is configured to generate the first current.

7. The chip according to claim 6, wherein the reference current generating unit comprises the second transistor, the fourth transistor, an eighth transistor, a ninth transistor, a tenth transistor, an eleventh transistor, a twelfth transistor, a thirteenth transistor, a fifth capacitor, a sixth resistor, a seventh resistor, and an eighth resistor, wherein, a gate of the eighth transistor is electrically connected to the gate of the second transistor;

a source of the eighth transistor is electrically connected to the source of the second transistor, a source of the twelfth transistor, and a source of the thirteenth transistor; and a drain of the eighth transistor is electrically connected to a collector of the ninth transistor;

a base of the ninth transistor is electrically connected to a source of the tenth transistor, a collector of the eleventh transistor, and a first terminal of the eighth resistor;

a gate of the tenth transistor is electrically connected to a first terminal of the sixth resistor, the collector of the ninth transistor, and the drain of the eighth transistor; a second terminal of the sixth resistor is electrically connected to the first terminal of the fifth capacitor; a base of the eleventh transistor is electrically connected to the first terminal of the fourth resistor, the first terminal of the fifth resistor, the base of the sixth transistor, and the second terminal of the first capacitor; and an emitter of the eleventh transistor is electrically connected to a first terminal of the seventh resistor;

a second terminal of the fifth capacitor, an emitter of the ninth transistor, a second terminal of the seventh resistor, and a second terminal of the eighth resistor are grounded;

a gate of the twelfth transistor is electrically connected to a source of the twelfth transistor, a gate of the thirteenth transistor, and a drain of the tenth transistor; and a drain of the thirteenth transistor is configured to output the bandgap reference current.

8. The chip according to claim 7, wherein a resistance value of the third resistor is equal to a resistance value of the fourth resistor and the fifth resistor connected in parallel, and a resistance value of the fourth resistor is equal to a resistance value of the seventh resistor.

9. A power supply, comprising a chip including a reference source circuit, the reference source circuit comprising:

a first current generating unit configured to generate a first current;

a reference voltage generating unit electrically connected to the first current generating unit, configured to generate a bandgap reference voltage by using the first current; and a reference current generating unit electrically connected to both the first current generating unit and the reference voltage generating unit, and configured to generate a bandgap reference current by using the first current;

wherein the reference voltage generating unit comprises a first transistor, a second transistor, a third transistor, a fourth transistor, a fifth transistor, a first resistor, a second resistor, a third resistor, a first capacitor, and a second capacitor, and wherein:

a drain of the first transistor is electrically connected to a source of the second transistor, a source of the third transistor, and a voltage source; a gate of the first transistor is electrically connected to a first terminal of the second resistor, a drain of the third transistor, a collector of the fifth transistor, and a startup circuit and configured to receive a startup signal output by the startup circuit; and a source of the first transistor is electrically connected to a first terminal of the first resistor, a first terminal of the first capacitor, and a first terminal of the second capacitor, and configured to output the bandgap reference voltage;

both a second terminal of the first capacitor and a second terminal of the first resistor are electrically connected to the first current generating unit;

a second terminal of the second resistor is electrically connected to a first terminal of the third capacitor;

a drain of the second transistor is electrically connected to a gate of the second transistor, a gate of the third transistor and a collector of the fourth transistor;

a first terminal of the third resistor is electrically connected to the first current generating unit;

both a base of the fifth transistor and a base of the fourth transistor are electrically connected to the first current generating unit; and an emitter of the fifth transistor, an emitter of the fourth transistor, a second terminal of the third resistor, and a second terminal of the second capacitor are grounded.

10. The power supply according to claim 9, wherein the first current generating unit comprises a fourth resistor, a fifth resistor, a sixth transistor, and a seventh transistor, wherein, a first terminal of the fourth resistor is electrically connected to the second terminal of the first capacitor, the second terminal of the first resistor, a first terminal of the fifth resistor, and a base of the sixth transistor; and a second terminal of the fourth resistor is electrically connected to a collector of the sixth transistor, a base of the seventh transistor, and the base of the fourth transistor;

a second terminal of the fifth resistor is electrically connected to both a collector of the seventh transistor and the base of the fifth transistor;

both an emitter of the sixth transistor and an emitter of the seventh transistor are electrically connected to the first terminal of the third resistor; and wherein the collector of the sixth transistor is configured to generate the first current.

11. The power supply according to claim 10, wherein the reference current generating unit comprises the second transistor, the fourth transistor, an eighth transistor, a ninth transistor, a tenth transistor, an eleventh transistor, a twelfth transistor, a thirteenth transistor, a fifth capacitor, a sixth resistor, a seventh resistor, and an eighth resistor, wherein, a gate of the eighth transistor is electrically connected to the gate of the second transistor; a source of the eighth transistor is electrically connected to the source of the second transistor, a source of the twelfth transistor, and a source of the thirteenth transistor; and a drain of the eighth transistor is electrically connected to a collector of the ninth transistor;

a base of the ninth transistor is electrically connected to a source of the tenth transistor, a collector of the eleventh transistor, and a first terminal of the eighth resistor;

a gate of the tenth transistor is electrically connected to a first terminal of the sixth resistor, the collector of the ninth transistor, and the drain of the eighth transistor; a second terminal of the sixth resistor is electrically connected to the first terminal of the fifth capacitor; a base of the eleventh transistor is electrically connected to the first terminal of the fourth resistor, the first terminal of the fifth resistor, the base of the sixth transistor, and the second terminal of the first capacitor; and an emitter of the eleventh transistor is electrically connected to a first terminal of the seventh resistor;

a second terminal of the fifth capacitor, an emitter of the ninth transistor, a second terminal of the seventh resistor, and a second terminal of the eighth resistor are grounded;

a gate of the twelfth transistor is electrically connected to a source of the twelfth transistor, a gate of the thirteenth transistor, and a drain of the tenth transistor; and a drain of the thirteenth transistor is configured to output the bandgap reference current.

12. The power supply according to claim 11, wherein a resistance value of the third resistor is equal to a resistance value of the fourth resistor and the fifth resistor connected in parallel, and a resistance value of the fourth resistor is equal to a resistance value of the seventh resistor.

13. An electronic apparatus, comprising a power supply, wherein the power supply comprises a chip including a reference source circuit, the reference source circuit comprising:

a first current generating unit configured to generate a first current;

a reference voltage generating unit electrically connected to the first current generating unit, configured to generate a bandgap reference voltage by using the first current; and a reference current generating unit electrically connected to both the first current generating unit and the reference voltage generating unit, and configured to generate a bandgap reference current by using the first current;

wherein the reference voltage generating unit comprises a first transistor, a second transistor, a third transistor, a fourth transistor, a fifth transistor, a first resistor, a second resistor, a third resistor, a first capacitor, and a second capacitor, and wherein:

a drain of the first transistor is electrically connected to a source of the second transistor, a source of the third transistor, and a voltage source; a gate of the first transistor is electrically connected to a first terminal of the second resistor, a drain of the third transistor, a collector of the fifth transistor, and a startup circuit and configured to receive a startup signal output by the startup circuit; and a source of the first transistor is electrically connected to a first terminal of the first resistor, a first terminal of the first capacitor, and a first terminal of the second capacitor, and configured to output the bandgap reference voltage;

both a second terminal of the first capacitor and a second terminal of the first resistor are electrically connected to the first current generating unit;

a second terminal of the second resistor is electrically connected to a first terminal of the third capacitor;

a drain of the second transistor is electrically connected to a gate of the second transistor, a gate of the third transistor and a collector of the fourth transistor;

a first terminal of the third resistor is electrically connected to the first current generating unit;

both a base of the fifth transistor and a base of the fourth transistor are electrically connected to the first current generating unit; and an emitter of the fifth transistor, an emitter of the fourth transistor, a second terminal of the third resistor, and a second terminal of the second capacitor are grounded.

14. The electronic apparatus according to claim 13, wherein the first current generating unit comprises a fourth resistor, a fifth resistor, a sixth transistor, and a seventh transistor, wherein, a first terminal of the fourth resistor is electrically connected to the second terminal of the first capacitor, the second terminal of the first resistor, a first terminal of the fifth resistor, and a base of the sixth transistor; and a second terminal of the fourth resistor is electrically connected to a collector of the sixth transistor, a base of the seventh transistor, and the base of the fourth transistor;

a second terminal of the fifth resistor is electrically connected to both a collector of the seventh transistor and the base of the fifth transistor;

both an emitter of the sixth transistor and an emitter of the seventh transistor are electrically connected to the first terminal of the third resistor; and wherein the collector of the sixth transistor is configured to generate the first current.

15. The power supply according to claim 14, wherein the reference current generating unit comprises the second transistor, the fourth transistor, an eighth transistor, a ninth transistor, a tenth transistor, an eleventh transistor, a twelfth transistor, a thirteenth transistor, a fifth capacitor, a sixth resistor, a seventh resistor, and an eighth resistor, wherein, a gate of the eighth transistor is electrically connected to the gate of the second transistor; a source of the eighth transistor is electrically connected to the source of the second transistor, a source of the twelfth transistor, and a source of the thirteenth transistor; and a drain of the eighth transistor is electrically connected to a collector of the ninth transistor;

a base of the ninth transistor is electrically connected to a source of the tenth transistor, a collector of the eleventh transistor, and a first terminal of the eighth resistor;

a gate of the tenth transistor is electrically connected to a first terminal of the sixth resistor, the collector of the ninth transistor, and the drain of the eighth transistor; a second terminal of the sixth resistor is electrically connected to the first terminal of the fifth capacitor; a base of the eleventh transistor is electrically connected to the first terminal of the fourth resistor, the first terminal of the fifth resistor, the base of the sixth transistor, and the second terminal of the first capacitor; and an emitter of the eleventh transistor is electrically connected to a first terminal of the seventh resistor;

a second terminal of the fifth capacitor, an emitter of the ninth transistor, a second terminal of the seventh resistor, and a second terminal of the eighth resistor are grounded;

a gate of the twelfth transistor is electrically connected to a source of the twelfth transistor, a gate of the thirteenth transistor, and a drain of the tenth transistor; and a drain of the thirteenth transistor is configured to output the bandgap reference current.

16. The power supply according to claim 15, wherein a resistance value of the third resistor is equal to a resistance value of the fourth resistor and the fifth resistor connected in parallel, and a resistance value of the fourth resistor is equal to a resistance value of the seventh resistor.

* * * * *